(12) United States Patent
Ulrey et al.

(10) Patent No.: US 9,394,837 B2
(45) Date of Patent: Jul. 19, 2016

(54) METHOD AND SYSTEM FOR REGENERATING A PARTICULATE FILTER

(75) Inventors: Joseph Norman Ulrey, Dearborn, MI (US); Adam Nathan Banker, Plymouth, MI (US); William Charles Ruona, Farmington Hills, MI (US); Henry W. Patterson, Waterford, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 755 days.

(21) Appl. No.: 13/584,485

(22) Filed: Aug. 13, 2012

(65) Prior Publication Data
US 2014/0041362 A1 Feb. 13, 2014

(51) Int. Cl.
| | | |
|---|---|---|
| *F01N 3/00* | (2006.01) | |
| *F02D 37/02* | (2006.01) | |
| *F02D 41/00* | (2006.01) | |
| *F02D 41/02* | (2006.01) | |
| *F02P 5/15* | (2006.01) | |
| *F02D 41/12* | (2006.01) | |
| *F01N 3/10* | (2006.01) | |
| *F01N 3/035* | (2006.01) | |

(52) U.S. Cl.
CPC ............ *F02D 37/02* (2013.01); *F02D 41/0005* (2013.01); *F02D 41/0087* (2013.01); *F02D 41/025* (2013.01); *F02D 41/029* (2013.01); *F02P 5/1512* (2013.01); *F01N 3/035* (2013.01); *F01N 3/101* (2013.01); *F02D 41/0007* (2013.01); *F02D 41/12* (2013.01); *F02D 2041/0022* (2013.01); *Y02T 10/22* (2013.01); *Y02T 10/26* (2013.01); *Y02T 10/42* (2013.01); *Y02T 10/46* (2013.01)

(58) Field of Classification Search
CPC ..... F02D 41/0087; F02D 41/029; F02D 41/0005
USPC .................................................. 60/295, 275
See application file for complete search history.

(56) References Cited

U.S. PATENT DOCUMENTS

| | | | | |
|---|---|---|---|---|
| 5,609,021 | A * | 3/1997 | Ma ........................... | F01N 3/025 60/274 |
| 6,195,985 | B1 * | 3/2001 | del Re et al. .................... | 60/274 |
| 7,021,050 | B2 | 4/2006 | Nishimura et al. | |
| 2003/0217876 | A1 * | 11/2003 | Severinsky et al. .......... | 180/65.2 |
| 2004/0123589 | A1 | 7/2004 | Ohtake et al. | |
| 2004/0226287 | A1 * | 11/2004 | Edgar et al. ..................... | 60/295 |
| 2009/0193796 | A1 * | 8/2009 | Wei et al. ........................ | 60/297 |
| 2010/0205942 | A1 | 8/2010 | Fujiwara et al. | |
| 2011/0072783 | A1 * | 3/2011 | Hepburn et al. ................ | 60/274 |
| 2011/0072784 | A1 | 3/2011 | Hepburn et al. | |
| 2011/0120090 | A1 * | 5/2011 | Sorensen, Jr. ................... | 60/274 |
| 2011/0126520 | A1 * | 6/2011 | Kim ................................ | 60/278 |
| 2013/0061573 | A1 * | 3/2013 | In et al. .......................... | 60/274 |

* cited by examiner

*Primary Examiner* — Audrey K Bradley
*Assistant Examiner* — Anthony Ayala Delgado
(74) *Attorney, Agent, or Firm* — Julia Voutyras; Alleman Hall McCoy Russell & Tuttle LLP

(57) ABSTRACT

An engine system and method for operating an engine that includes a particulate filter is described. In one example, spark delivery to one or more engine cylinders is ceased while fuel is continued to be injected to the one or more cylinders to improve particulate filter regeneration. The system and method may be particularly beneficial for direct injection turbocharged engines.

19 Claims, 5 Drawing Sheets

METHOD AND SYSTEM FOR REGENERATING A PARTICULATE FILTER

BACKGROUND/SUMMARY

Direct injection gasoline engines may provide increased performance so that engine efficiency may be improved. Directly injecting fuel into a cylinder can reduce temperature in a cylinder so that more air and fuel may be drawn into the cylinder. However, the air-fuel mixture within the cylinder may not be fully vaporized at the time of ignition at higher engine speeds and loads since there is less time to mix air with the fuel. Consequently, a portion of injected fuel may not completely oxidize, thereby forming carbonaceous soot within the cylinder. After the soot is expelled from the engine, the soot may be stored in a particulate filter for subsequent oxidation; however, it may be challenging to initiate combustion in the particulate filter. One possible way to initiate regeneration (e.g., reduce an amount of soot stored in the particulate filter) in the particulate filter is to retard engine spark timing to increase cylinder exhaust port temperature. However, it may take longer than is desired for temperatures in the port to reach the particulate filter so that regeneration may begin.

The inventors herein have recognized the above-mentioned limitations and have developed an engine operating method, comprising: supplying a spark to combust an air-fuel mixture in an engine; storing particulate matter produced by combusting the air-fuel mixture in a particulate filter; and regenerating the particulate filter while engine load is less than a threshold and in response to a tip-out condition via ceasing to deliver spark to one or more cylinders and supplying fuel to the one or more cylinders.

By ceasing or stopping spark delivery to one or more cylinders, fuel can be supplied to the cylinder so that the fuel is ejected from the cylinders into the exhaust system where it may oxidize closer to the particulate filter. In one example, the fuel supplied to a cylinder where spark is inhibited may increase a temperature of a three-way catalyst positioned upstream of the particulate filter so that heat may be transferred from the three-way catalyst to the particulate filter. In this way, regeneration of a particulate filter may be initiated during low engine load conditions. For example, during vehicle deceleration after a tip-out (e.g., release of an accelerator pedal or a decrease in engine torque demand), spark supplied to a cylinder may be stopped while the engine continues to rotate via torque supplied by vehicle wheels. Fuel may be injected to cylinders where spark is stopped and then ejected to a three-way catalyst in an exhaust system shortly thereafter. The oxidizing fuel heats the particulate filter so that soot held within the particulate filter may be oxidized.

The present description may provide several advantages. Specifically, the approach may use fuel to regenerate a particulate filter in a more efficient manner. Additionally, the approach may provide improved emissions after particulate filter regeneration by improving catalyst chemistry. Further, the approach may provide increased opportunities for regenerating a particulate filter.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
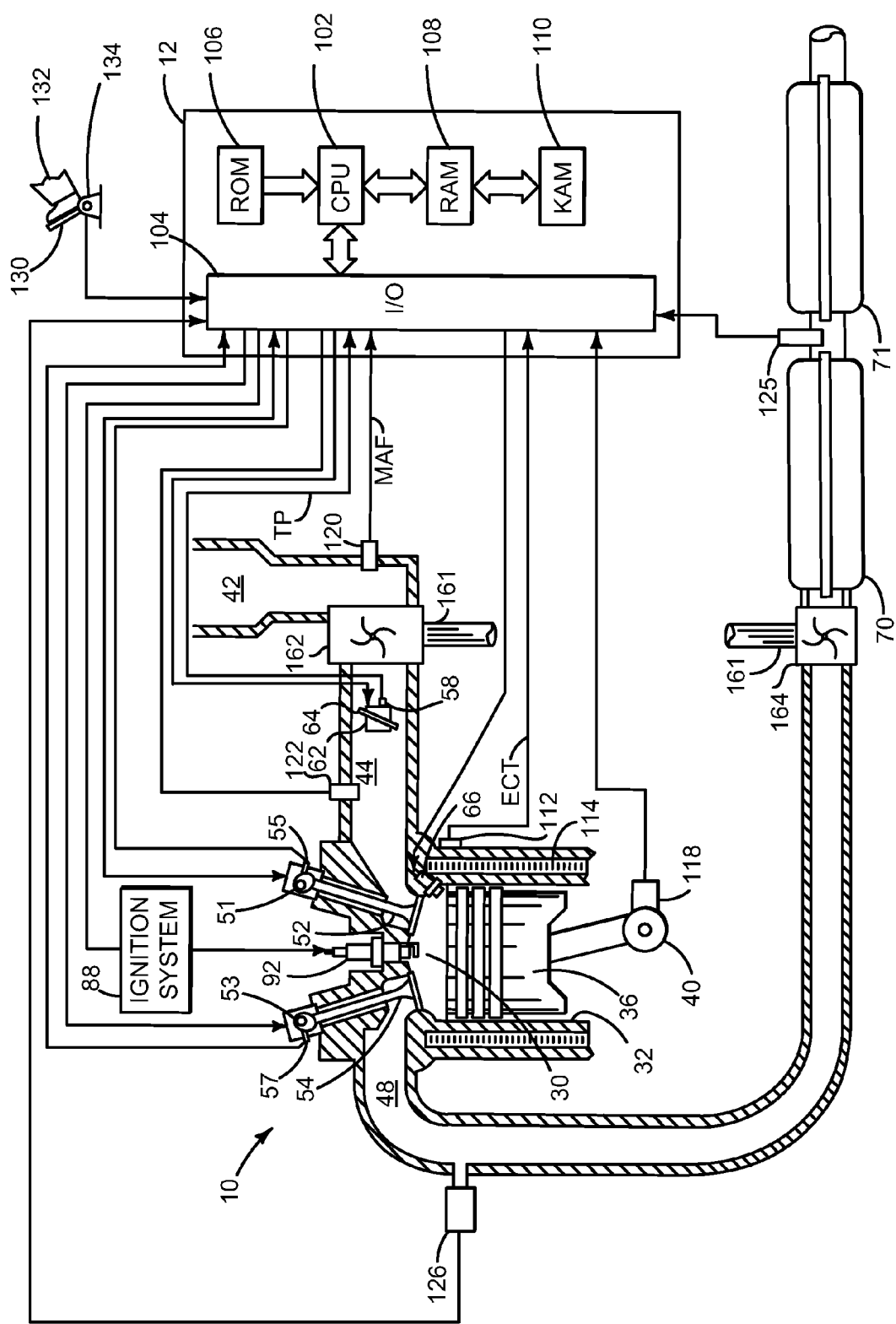
FIG. 1 shows a schematic depiction of an engine.

The present description is related to operating a spark ignited engine that includes a particulate filter in its exhaust system. One example system is shown in FIG. 1. The engine and exhaust system may be operated to provide the sequence of FIG. 2 via the method shown in FIGS. 3 and 4. The method includes modes for regenerating the particulate filter at higher engine loads and lower engine loads. In one example, the particulate filter may be regenerated while a vehicle is coasting or decelerating from a higher speed to a lower speed. The engine may operate in a vehicle as shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided by controller 12. Fuel is delivered to fuel injector 66 by a fuel system (not shown) including a fuel tank, fuel pump, and fuel rail (not shown).

Intake manifold 44 is supplied air by compressor 162. Exhaust gases rotate turbine 164 which is coupled to shaft 161, thereby driving compressor 162. In some examples, a bypass passage is included so that exhaust gases may bypass turbine 164 during selected operating conditions. Further, a compressor bypass passage may be provided in some examples to limit pressure provided by compressor 162. In addition, intake manifold 44 is shown communicating with central throttle 62 which adjusts a position of throttle plate 64 to control air flow from engine air intake 42. Central throttle 62 may be electrically operated.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. Particulate filter 71 is positioned downstream of converter 70. A second UEGO 125 is positioned downstream of converter 70 to provide an indication of the oxygen storage state of converter 70.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for a system, comprising: an engine; an ignition system supplying spark to the engine; a particulate filter in an exhaust system of the engine; and a controller including executable instructions stored in non-transitory memory for retarding spark timing and increasing a time-varying amplitude of an air-fuel ratio to regenerate the particulate filter in a first mode, and executable instructions to cease spark delivery to regenerate the particulate filter in a second mode. The system further comprises additional executable instructions for additionally retarding spark when the air-fuel ratio is lean in the first mode.

In one example, the system further comprises a three-way catalyst and additional executable instructions for adjusting oxygen stored in the three-way catalyst responsive to a regeneration state of the particulate filter. The system further comprises additional executable instructions to supply fuel to a cylinder during an exhaust stroke in response to an increase in and engine load request during the second mode. The system further comprises additional executable instructions to lean an engine air-fuel ratio in response to a lean state of a catalyst during an increase in an engine load request during the second mode. The system also includes where the time-varying amplitude varies between rich and lean of stoichiometry.

Figure 2:
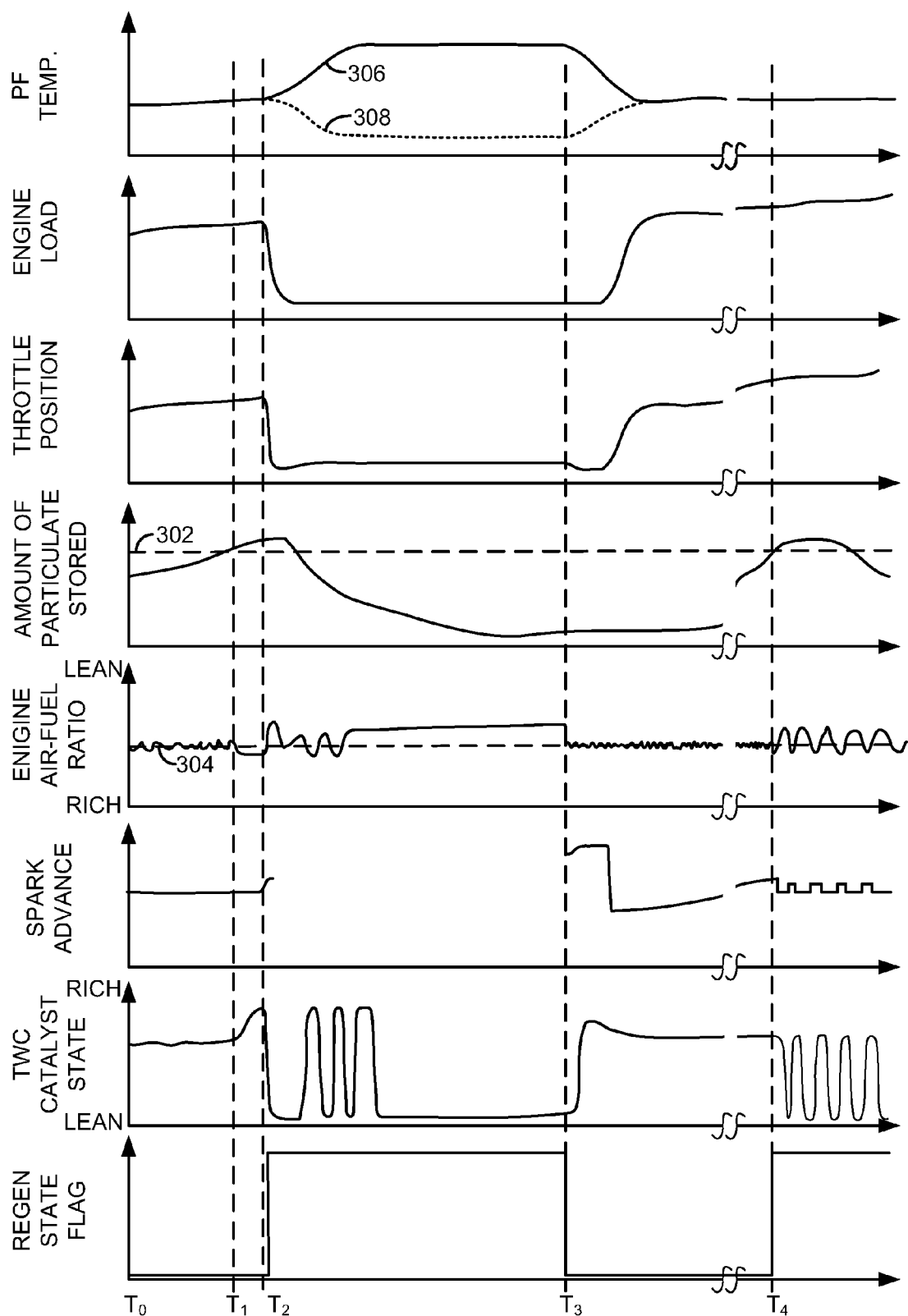
FIG. 2 shows an example prophetic engine and exhaust operating sequence.

Referring now to FIG. 2, an example prophetic engine and exhaust system operating sequence is shown. The sequence may be provided by the system of FIG. 1 executing instructions of the method shown in FIGS. 3 and 4. The vertical markers represent specific times of interest in the sequence.

The first plot from the top of FIG. 2 is a plot of particulate filter (PF) temperature versus time. The X-axis represents time and the Y axis represents PF temperature. Time increases from the left side of the figure to the right side of the figure. PF temperature increases in the direction of the Y axis arrow. Signal trace 306 represents PF temperature according to the method of FIGS. 3 and 4. Signal trace 306 represents PF temperature during conditions of a tip-out without the method of FIGS. 3 and 4. A time line break between time $T_3$ and time $T_4$ is indicated by double SS. The time interval between time $T_3$ and time $T_4$ may be measured in minutes or hours. The time lines of the second through eighth plots also include the time line break. Further, the time lines of the first thorough eighth plots are aligned in time.

The second plot from the top of FIG. 2 is a plot of requested engine load versus time. The X-axis represents time and the Y axis represents engine load. Requested engine load may be determined via accelerator pedal 130 shown in FIG. 1. Time increases from the left side of the figure to the right side of the figure. Requested engine load increases in the direction of the Y axis arrow. Requested engine load may be characterized as an engine torque or in some examples as an amount of air supplied to the engine.

The third plot from the top of FIG. 2 is a plot of engine throttle position versus time. The X-axis represents time and the Y axis represents engine throttle position. Time increases from the left side of the figure to the right side of the figure. Throttle position increases in the direction of the Y axis arrow which represents an increased throttle opening amount.

The fourth plot from the top of FIG. 2 is a plot of an amount of particulate matter stored within a particulate filter at a location downstream of an engine (e.g., 71 of FIG. 1) versus time. The X-axis represents time and the Y axis represents an amount of particulate matter stored in a particulate filter. The amount of particulate matter may be determined via exhaust pressure upstream and downstream of the particulate filter as is known in the art. Time increases from the left side of the figure to the right side of the figure. The amount of stored particulate matter increases in the direction of the Y axis arrow. Horizontal marker 302 represents a threshold level of particulate matter where it is desirable to regenerate the particulate filter.

The fifth plot from the top of FIG. 2 is a plot of engine air-fuel ratio versus time. A cylinder air-fuel mixture may or may not be combusted in the engine depending on the engine and exhaust operating mode. The X-axis represents time and the Y axis represents engine air-fuel ratio. Time increases from the left side of the figure to the right side of the figure. Engine air-fuel ratio becomes leaner in the direction of the Y axis arrow. A stoichiometric air-fuel ratio is indicated by horizontal marker 304.

The sixth plot from the top of FIG. 2 is a plot of engine spark advance versus time. The X-axis represents time and the Y axis represents engine spark advance. Time increases from the left side of the figure to the right side of the figure. Engine spark timing advances in the direction of the Y axis arrow.

The seventh plot from the top of FIG. 2 is a plot of three-way catalyst state versus time. In one example, the three-way catalyst state is determined based on an oxygen sensor positioned in the exhaust stream downstream of the three-way catalyst (e.g., 125 of FIG. 1). The three-way catalyst state indicates a richer condition (e.g., less oxygen stored within the catalyst in the direction of the Y axis arrow. The three-way catalyst state indicates a leaner condition (e.g., more oxygen stored within the catalyst when the trace is near the X axis. The X-axis represents time and the Y axis represents three-way catalyst state. Time increases from the left side of the figure to the right side of the figure.

The eighth plot from the top of FIG. 2 is a plot of particulate filter regeneration state flag versus time. The X-axis represents time and the Y axis represents the state of particulate filter regeneration. Time increases from the left side of the figure to the right side of the figure. The particulate filter is not being regenerated when the trace is near the X axis. The particulate filter is being regenerated when the trace is at a higher level away from the X axis.

At time $T_0$, engine load is at a higher level indicating a relatively high engine load. Particulate filter temperature is at a medium level. The throttle opening is also open to a greater amount. The amount of particulate matter stored in the particulate filter is less than the threshold level 302 where it is desirable to regenerate the particulate filter. The engine air-fuel ratio is shown oscillating about stoichiometric conditions with a smaller alternating amplitude. Spark advance is at a moderate level (e.g., 25 degrees advance of top-dead-center compression stroke). The three-way catalyst state is slightly rich indicating oxygen storage cites may be available. The particulate filter regeneration state flag is at a low level indicating that the particulate filter is not being regenerated.

At time $T_1$, engine load and throttle opening amount are still relatively high and have increased since time $T_0$. The amount of particulate matter stored in the particulate filter has increased to the level 302 where it is desirable to regenerate the particulate filter. However, regeneration is delayed a short time until operating conditions for particulate filter regeneration are at desired conditions. The engine air-fuel ratio is enriched to keep the temperature of a three-way catalyst coupled to the engine below a threshold temperature. The spark advance is maintained at a relatively advanced level. The three-way catalyst state begins to move toward a more rich state as oxygen stored in the catalyst is consumed combusting hydrocarbons. The particulate filter regeneration state flag is at a low level indicating that the particulate filter is not being regenerated.

At time $T_2$, the engine load is decreased as is the engine throttle opening amount. In this example, the engine throttle opening amount is closed in response to a tip-out condition which facilitates particulate filter regeneration. Thus, there is a transition from a higher engine load to a lower engine load, for example a tip-out or release of an accelerator pedal. In one example, the transition represents conditions of vehicle deceleration where the vehicle brakes may or may not be applied. The particulate matter stored within the particulate filter has increased a small amount since time $T_1$. The engine air-fuel ratio is driven a to a leaner air-fuel ratio a short time after the transition begins to increase temperature in the three-way catalyst, thereby promoting oxidation of particulate matter in the particulate filter. The regeneration state flag also changes state from a low value to a higher value to indicate particulate filter regeneration has commenced. Shortly thereafter, spark delivery to one or more engine cylinders ceases. For example, spark delivery to all six cylinders of a six cylinder engine may stop. Alternatively, spark delivery to three, or some other subset of engine cylinders may cease. Thus, combustion ceases in cylinders where spark is stopped. The throttle position is also shown being opened a small amount in response to particulate filter regeneration. Opening the throttle allows air and fuel that has not been combusted to reach the three-way catalyst where it may be oxidized to increase temperature of the three-way catalyst and the particulate filter. The engine air-fuel ratio amplitude is increased to supply additional amounts of fuel and air to the three-way catalyst. The engine air-fuel cyclic rate of change may be low enough to change the state of the three-way catalyst as indicated in the sixth plot from the top of FIG. 2. In other words, the engine air-fuel rate of change may be low enough to cause breakthrough of air and/or hydrocarbons at the three-way catalyst. Alternatively, the engine air-fuel rate of change may be fast enough to increase three-way catalyst temperature without causing breakthrough. The engine continues to rotate via torque supplied to the engine by vehicle wheels as vehicle inertia is transferred to the engine so that the engine can continue to rotate even though spark delivery is ceased in one or more engine cylinders.

Between time $T_2$ and time $T_3$, engine load remains low and the throttle position is adjusted to provide a desired oxidation rate within the catalyst and the particulate filter. The throttle position is not adjusted in response to the operator demand because the operator demand is zero. If the particulate filter oxidation rate is higher than desired, the throttle opening amount is closed. If the particulate filter oxidation rate is lower than desired, the throttle opening amount may be opened. The engine air-fuel ratio is driven between lean and rich of stoichiometry. In some examples, fuel injection to engine cylinders not receiving spark is deactivated in response to a rate of oxidation within the particulate filter so that fuel may be conserved. For example, when the particulate filter reaches a threshold temperature, injection of fuel to cylinders not receiving spark is stopped. The temperature of the particulate filter increases between time $T_2$ and time $T_3$. The temperature of the particulate filter when the present method is not used decreases.

At time $T_3$, the engine load is still at a low level and the amount of particulates stored in the particulate filter has reached a level where it is desirable to stop particulate filter regeneration. Consequently, particulate filter regeneration is stopped as indicated by the particulate regeneration flag transitioning from a higher level to a lower level. The particulate filter temperature begins to decrease. Spark delivery to engine cylinders where spark is deactivated is also resumed at time $T_3$. The engine air-fuel ratio amplitude is also reduced to improve three-way catalyst efficiency. The three-way catalyst state is also driven back to a level between a rich state and a lean state.

Between time $T_3$ and time $T_4$, the amount of particulates stored in the particulate filter increases as fuel is combusted within the engine. Particulate matter may accumulate faster when the engine is operated at higher engine speeds and loads. The particulate matter store in the particulate filter increases significantly between the time brake interval.

At time $T_4$, the amount of particulate matter stored in the particulate filter reaches level 302 where it is desirable to regenerate the particulate filter. The engine is operating at a higher engine load and the throttle is opened a relatively large amount. The particulate regeneration flag is set to a higher level to indicate that particulate filter regeneration is under way. The spark advance is retarded to increase particulate filter temperature. The spark advance is additionally retarded when the engine is operated lean to reduce engine NOx output. The spark retard may be compensated by increasing air flow through the engine via increasing the throttle opening area or valve timing. The engine air-fuel ratio amplitude between rich and lean operation is also increased as compared to when the engine is not operated in a particulate filter regeneration mode. The amount of particulate matter begins do decline after particulate filter regeneration begins.

Thus, regeneration of the particulate filter may occur at different times during different operating conditions. The particulate filter may be regenerated without spark being applied to one or more cylinders when engine load is low or at higher engine loads when spark timing is retarded.

Figure 3:
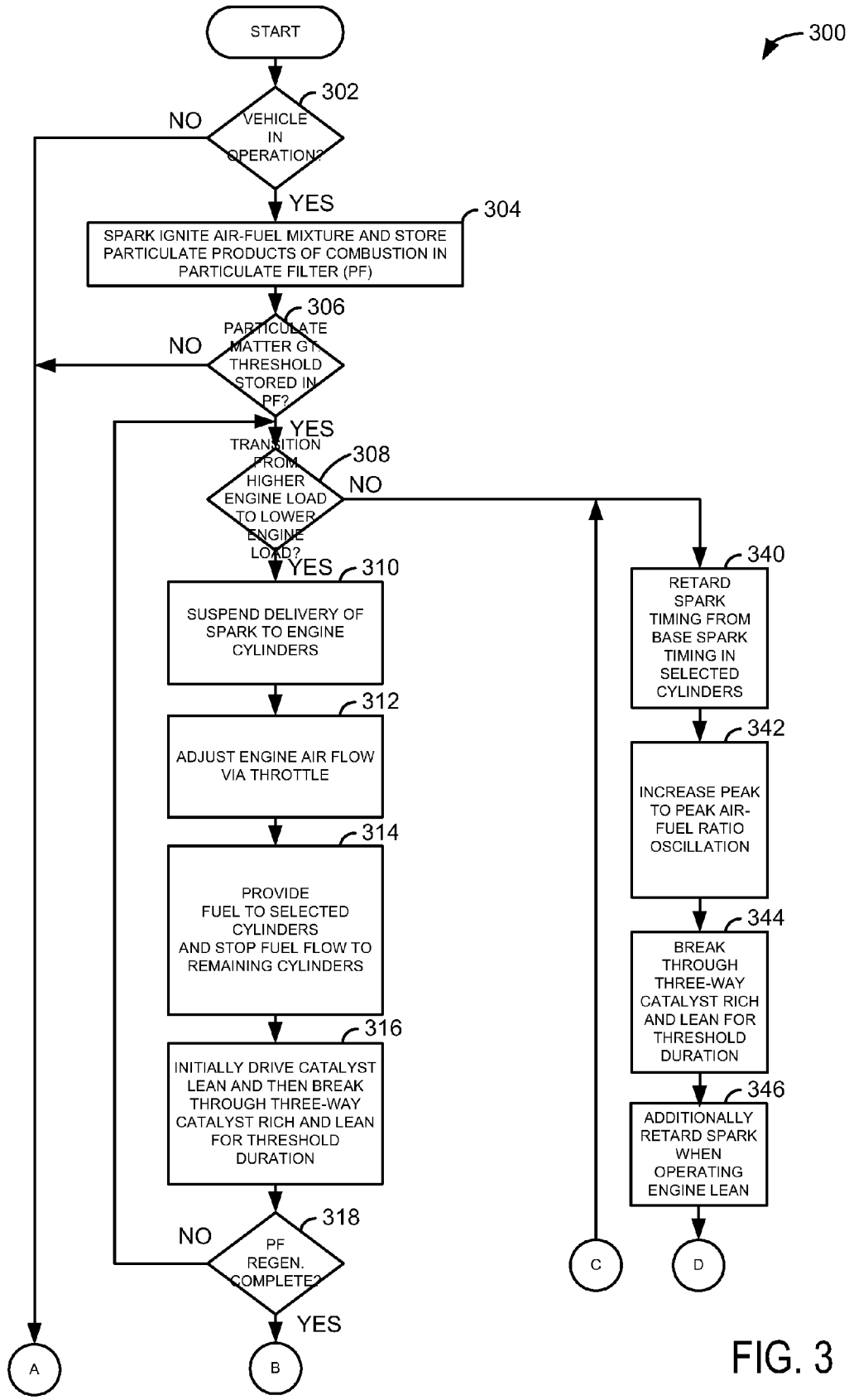
FIGS. 3 and 4 show a flowchart of an example method for operating an engine.
Figure 4:
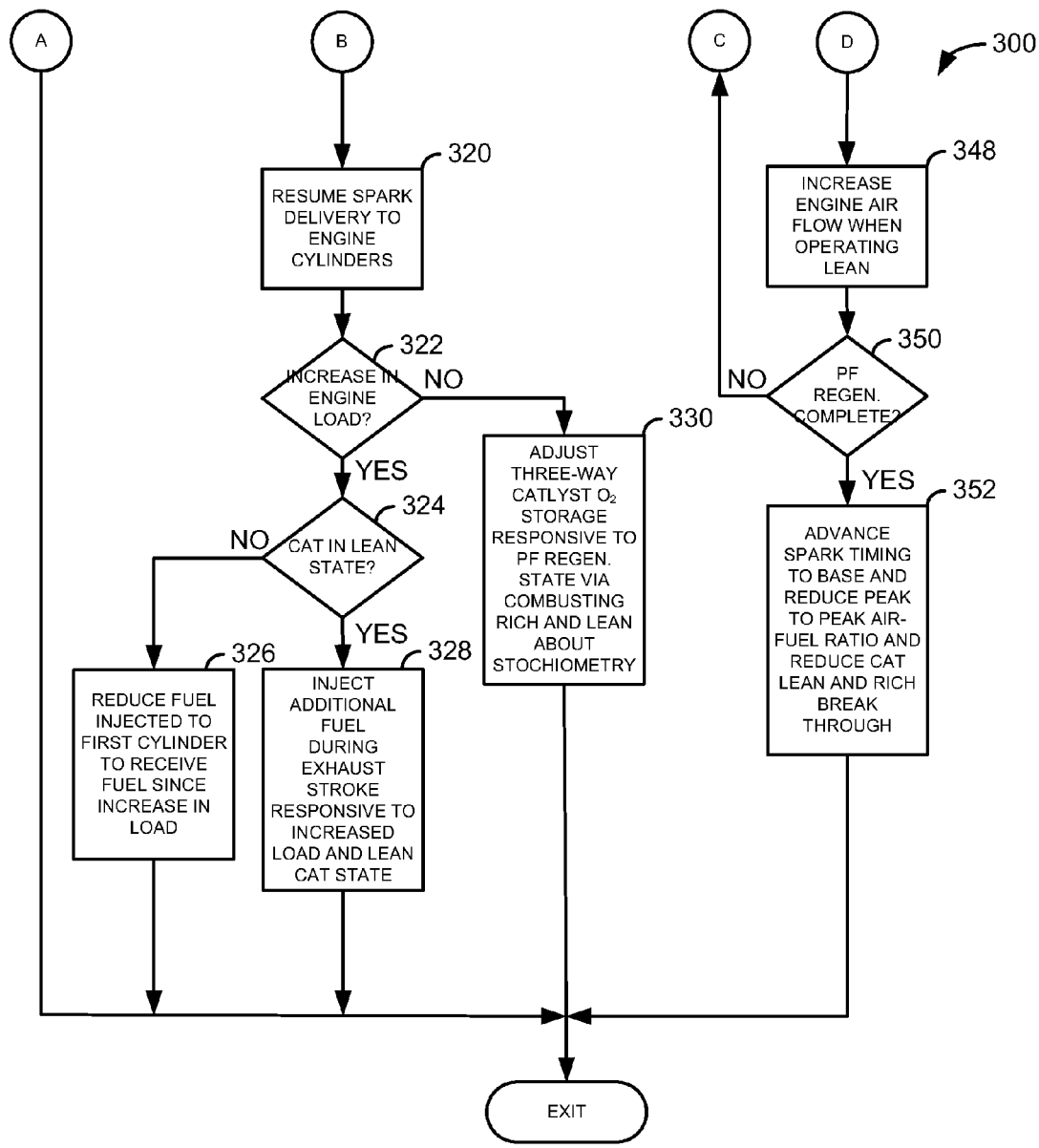
Figure 5:
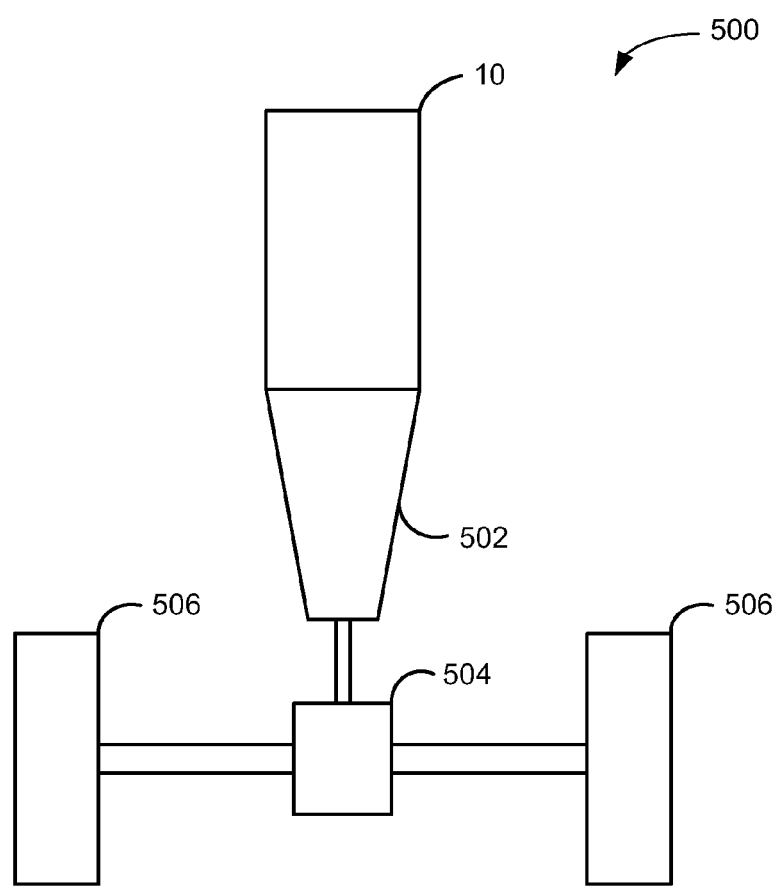
FIG. 5 shows an example vehicle in which the engine of FIG. 1 operates.

Referring now to FIGS. 3 and 4, a method for regenerating a particulate filter is shown. The method of FIGS. 3 and 4 may be stored as executable instructions in non-transitory memory of controller 12 of FIG. 1. Additionally, the method of FIGS. 3 and 4 may provide the sequence shown in FIG. 2.

At 302, method 300 judges whether or not the vehicle is in an operating state. A vehicle may be judged to be in an operating state when a command to operate the vehicle is given (e.g., via a key switch or remote signal). If method 300 judges that the vehicle is in an operating state, the answer is yes and method 300 proceeds to 304. Otherwise, the answer is no and method 300 proceeds to exit.

At 304, method 300 provides spark ignition to engine air-fuel mixtures and particulate matter that may be formed during combustion are stored in a particulate filter in an exhaust system coupled to the engine. The engine rotates via combustion torque provided by spark igniting the engine air-fuel mixtures. Method 300 proceeds to 306 after spark ignition is provided to engine cylinders.

At 306, method 300 judges whether or not particulate matter stored in a particulate filter is greater than a threshold amount. In one example, the amount of particulates stored in a particulate filter may be estimated based on a pressure drop across the particulate filter at a given flow rate though the particulate filter. The pressure drop may be monitored via pressure sensors located in the exhaust at locations upstream and downstream of the particulate filter. The greater the pressure drop, the greater particulate matter accumulation within the particulate filter. If it is judged that more than a threshold amount of particulate matter is stored in the particulate filter, the answer is yes and method 300 proceeds to 308. Otherwise, the answer is no and method 300 proceeds to exit.

At 308, method 300 judges whether or not there is a transitions from a higher engine load to a lower engine load. In some examples, method 300 simply judges whether the engine is operating at a lower engine load and the vehicle is moving. Additionally, method 300 may judge if a tip-out is present and engine load is trending lower or lower than a threshold level. If so, the answer is yes method 300 proceeds to 310. Otherwise, the answer is no and method 300 proceeds to 340.

If the particulate matter stored in the particulate filter is less than a threshold level and a tip-out to a low engine load occurs, fuel is not delivered to engine cylinders and spark is deactivated or may remain active such that the engine enters a deceleration fuel cut-out mode to conserve fuel at low engine loads where torque to rotate the engine is provided via vehicle wheels.

At 310, method 300 suspends or stops delivery of spark to one or more engine cylinders and the engine continues to rotate via torque supplied from vehicle wheels. The vehicle wheels transfer the vehicle's kinetic energy to the engine to maintain engine rotation. Thus, engine rotational energy is derived from vehicle wheels immediately after the rotational energy is provided from combustion so that engine rotation does not stop. In some examples, spark delivery is stopped to all engine cylinders. In other examples, spark delivery is suspended to less than the total number of engine cylinders. Method 300 proceeds to 312 after spark delivery to selected cylinders is stopped.

At 312, method 300 adjusts engine air flow via a throttle and/or valve timing adjustments. In one example, the throttle is opened to an amount where an exothermic reaction occurs in a three-way catalyst positioned downstream of the engine. The throttle opening amount may be adjusted in response to a temperature of the three-way catalyst and/or the temperature of the particulate filter. If catalyst or particulate filter temperature is less than desired, the throttle opening amount may be increased by a predetermined amount based a temperature difference between the actual catalyst/particulate filter temperature and the desired catalyst/particulate filter temperature. Method 300 proceeds to 314 after air flow through the engine is adjusted.

At 314, method 300 provides fuel to cylinders in which spark delivery is stopped. However, if three-way catalyst temperature is less than a threshold temperature (e.g., a temperature where injected fuel will combust), fuel is not injected to the engine while spark is stopped. Further, fuel flow may be provided to cylinders where spark is delivered to keep the engine rotating. In some examples, vehicle inertia during vehicle deceleration allows the engine to continue rotating while spark is not delivered to engine cylinders. Fuel is delivered to cylinders that do not receive spark based on a desired catalyst temperature and engine air flow. Method 300 proceeds to 316 after fuel is supplied to engine cylinders.

Thus, particulate filter regeneration is initiated by ceasing spark delivery and injection of fuel into cylinders where spark delivery is stopped during low load conditions in response to an amount of particulate matter stored within a catalyst and in response to a tip-out condition where the vehicle continues to move on a road.

At 316, method 300 initially drives the engine air-fuel ratio to a lean level to provide oxygen to oxidize hydrocarbons that may be stored within the three-way catalyst. Method 300 also increases the air-fuel ratio amplitude about stoichiometric conditions to further promote particulate filter regeneration. The engine air-fuel ratio may include fuel and air that is combusted along with fuel and air that is not combusted before passing from the engine. Method 300 proceeds to 318 after adjustments to the engine air-fuel ratio are provided.

At 318, method 300 judges whether or not particulate filter regeneration is complete. In one example, particulate filter regeneration may be determined to be complete when a pressure drop across the particulate filter at a given flow rate through the particulate filter is less than a threshold. If so, the answer is yes and method 300 proceeds to 320. Otherwise, the answer is no and method 300 returns to 308.

At 320, method 300 resumes delivering spark to engine cylinders where spark was ceased. In one example, spark is activated via allowing current to flow to an ignition coil.

At 322, method 300 judges whether or not there is an increase in engine load. In one example, an increase in engine load may be indicated via a position of an accelerator pedal operated by a vehicle driver. In some examples, it may be judged there is an increase in engine load when engine load is increased by more than a threshold amount. If method 300 judges that there is an increase in engine load, the answer is yes and method 300 proceeds to 324. Otherwise, the answer is no and method 300 proceeds to 330.

At 324, method 300 judges whether or not a three-way catalyst located downstream of the engine and upstream of particulate filter is in a lean state. In one example, it may be judged that a three-way catalyst in is a lean state via an oxygen sensor positioned downstream of the three-way catalyst indicating a lean condition. If method 300 judges that the three-way catalyst is in a lean state, the answer is yes and method 300 proceeds to 328. Otherwise, the answer is no and method 300 proceeds to 326.

At 328, method 300 injects additional fuel into engine cylinders to drive the three-way catalyst to a state between rich and lean. In one example, fuel is injected during an exhaust stroke of a cylinder receiving the fuel so that fuel may be supplied to the three-way catalyst as soon as possible after the change in engine load is detected. Since cylinder contents are evacuated to the exhaust system during an exhaust stroke, injecting fuel to the cylinder during its exhaust stroke can reduce an amount of time it takes to drive the three-way catalyst to a state between rich and lean. In this way, the state of the catalyst may be adjusted so that NOx may be better processed by the three-way catalyst during the increasing engine load. Method 300 proceeds to exit after fuel injected to engine cylinders is adjusted.

At 326, method 300 reduces an amount of fuel to a first cylinder to receive fuel after the increase in engine load. By reducing a fuel amount delivered to engine cylinders, it may be possible to move the state of the three-way catalyst to a condition balanced between rich and lean conditions. In particular, more oxygen may flow through the first cylinder so that oxygen may be stored at the three-way catalyst. Method 300 proceeds to exit after the amount of fuel injected to the engine is decreased.

At 330, method 300 adjusts an amount of oxygen stored within the three-way catalyst responsive to the regenerative state of the particulate filter via combusting rich and lean air-fuel mixtures about stoichiometry within engine cylinders. For example, after particulate filter regeneration is complete, the engine air-fuel ratio may be adjusted with more bias to a rich side of stoichiometry or to a lean side of stoichiometry so that oxygen storage within the three-way catalyst is balanced (e.g., 50% of available oxygen storage of the three-way catalyst is utilized). The state of the catalyst may be adjusted over time when engine load is not increasing so that an abrupt change in engine fueling is not required. In one example, where the three-way catalyst state is rich after regeneration, a lean bias is applied to the engine air-fuel ratio. When the three-way catalyst state is lean after regeneration, a rich bias is applied to the engine air-fuel ratio. In this way, the oxygen storage state of the three-way catalyst is adjusted after regenerating the particulate filter. Method 300 proceeds to exit after the amount of oxygen stored in the three-way catalyst is adjusted.

At 340, method 300 retards spark timing from base spark timing in selected cylinders to raise temperatures in the exhaust system. Raising exhaust temperatures at higher engine loads may facilitate particulate matter oxidation within the particulate filter since the higher mass flow rate at the higher engine load may drive temperatures downstream of the three-way catalyst higher. The amount of air flowing through the engine may be increased when spark is retarded so that equivalent engine torque is provided while spark is retarded. Method 300 proceeds to 342 after spark timing is retarded.

At 342, method 300 increases the engine air-fuel ratio amplitude variation around stoichiometric conditions. In one example, the peak-to-peak variation in engine air-fuel ratio about stoichiometric conditions is increased. Method 300 proceeds to 344 after adjusting the engine air-fuel ratio.

At 344, method 300 breaks through the three-way catalyst with rich and lean combustion products for threshold durations. For example, if a lean condition is determined at the three-way catalyst outlet, the lean condition is held for a predetermined amount of time. The amount of lean breakthrough time may be adjusted by decreasing an amount of fuel injected to engine cylinders for a desired duration. In this way, the amount of oxygen supplied to the particulate filter during particulate filter regeneration may be controlled. Method 300 proceeds to 346 after rich and lean break through conditions are adjusted.

At 346, method 300 provides additional spark retard to engine cylinders when the cylinders are operated lean so that NOx output of the cylinders may be reduced. The amount of spark retard may be proportionate to the leanness of engine air-fuel ratio. For example, if the engine is operated more lean, more spark retard may be provided. Method 300 proceeds to 348 after spark timing is retarded additionally during lean engine operation.

At 348, method 300 increases the amount of engine air flow while the engine is operated lean. The torque reduction occurring while cylinders are operated lean with retarded spark timing may be counteracted via increasing the engine air flow via opening the engine throttle. In this way, engine torque may be more uniform. Method 300 proceeds to 350 after engine air flow is adjusted.

At 350, method 300 judges whether or not particulate filter regeneration is complete. Particulate filter regeneration may be considered complete when a pressure drop across the particulate filter at a given flow rate through the particulate filter is less than a desired amount. If so, the answer is yes and method 300 proceeds to 352. Otherwise, the answer is no and method 300 returns to 340.

At 352, method 300 advances spark timing to base spark timing and reduces engine peak-to-peak air-fuel ratio so that rich and lean breakthrough the catalyst is reduced. The peak-to-peak air-fuel ratio may be reduced via operating the engine closer to stoichiometric conditions. Method 300 proceeds to exit after the engine spark and fuel are returned to base operation.

Thus, the method of FIG. 3 provides for an engine operating method, comprising: supplying a spark to combust an air-fuel mixture in an engine; storing particulate matter produced by combusting the air-fuel mixture in a particulate filter; and regenerating the particulate filter while engine load is less than a threshold and in response to a tip-out condition via ceasing to deliver spark to one or more cylinders and supplying fuel to the one or more cylinders. In this way, a particulate filter may be regenerated via creating heat in a three-way catalyst that is in closer proximity to the particulate filter than the engine.

The engine operating method includes where the particulate filter is positioned downstream of a three-way catalyst, and where the engine is rotated while spark delivery is ceased via torque supplied from vehicle wheels. The engine operating method further comprises adjusting an amount of air that flows that flows through the engine when regenerating the particulate filter. In some examples, the engine operating method includes where the amount of air that flows through the engine is adjusted via a throttle or valve timing. The engine operating method also includes where regeneration is initiated via supplying a lean air-fuel mixture from the engine to a three-way catalyst positioned upstream of the particulate filter. In one example, the engine operating method includes where combustion in the one or more cylinders ceases during regenerating the particulate filter, and where the engine was rotating via combustion in its cylinders immediately before regenerating the particulate filter and stopping spark delivery. The engine operating method includes where fuel injected to the one or more cylinders is combusted in a three-way catalyst positioned upstream of the particulate filter. The engine operating method further includes where the engine is a direct injection turbocharged engine, and where an amount of fuel supplied to the one or more cylinders is varied to provide rich and lean air-fuel mixtures to the one or more cylinders.

In another example, the method of FIGS. 3 and 4 provides for an engine operating method, comprising: supplying a spark to combust an air-fuel mixture in an engine; storing particulate matter produced by combusting the air-fuel mixture in a particulate filter; regenerating the particulate filter while engine load is less than a threshold via ceasing to deliver spark to a cylinder while engine load is less than a threshold and while the engine is rotating via torque supplied by vehicle wheels; and injecting fuel into the cylinder during an exhaust stroke of the cylinder in response to an increase in engine load. The engine operating method further comprises supplying fuel to the cylinder while ceasing to deliver spark to the cylinder. The engine operating method further comprises not delivering fuel to the cylinder while ceasing to deliver spark to the cylinder in response to engine load being less than the threshold and an amount of particulate matter stored in the particulate filter being less than a threshold.

In some examples, the engine operating method includes where the engine is in a deceleration fuel cut-out mode when not delivering fuel to the cylinder. The engine operating method also includes where fuel is injected during the exhaust stroke of the cylinder in response to a state of a catalyst being lean. The engine operating method further comprises ceasing to inject fuel to the cylinder when a temperature of a three-way catalyst.

Referring now to FIG. 5, an example vehicle in which engine 10 of FIG. 1 operates is shown. Vehicle 500 includes engine 10, transmission 502, differential 504, and wheels 506. When engine torque is positive, engine 10 supplies torque to rotate vehicle wheels 506 though gearing (not shown) in transmission 502. Differential 504 transfers torque from transmission 502 to wheels 506. When engine torque is negative, wheels 506 may supply torque to rotate engine 10 through transmission 502. Wheels 506 transfer the vehicle's kinetic energy to engine 10. In this way, the engine may continue to rotate even if spark and/or fuel are deactivated while the vehicle is moving.

As will be appreciated by one of ordinary skill in the art, the method described in FIGS. 3 and 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating on natural gas, gasoline, diesel, or alternative fuel configurations could use the present description to advantage.

The invention claimed is:

1. An engine operating method, comprising:
supplying a spark to combust an air-fuel mixture in an engine;
storing particulate matter produced by combusting the air-fuel mixture in a particulate filter; and
heating the particulate filter to facilitate particulate filter regeneration in response to engine load less than a threshold and a tip-out condition via ceasing to deliver spark to one or more cylinders and supplying fuel to the one or more cylinders, and where a particulate filter temperature increase for regeneration is initiated via supplying fuel and air in a lean air-fuel mixture from engine cylinders that are not combusting to a three-way catalyst positioned upstream of the particulate filter.

2. The engine operating method of claim 1, where the particulate filter is positioned downstream of the three-way catalyst, and where the engine is rotated while spark delivery is ceased via torque supplied from vehicle wheels, and further comprising injecting fuel to a cylinder during an exhaust stroke of the cylinder in response to the three-way catalyst being in a lean state, completing particulate filter regeneration, and an increase in engine load.

3. The engine operating method of claim 1, further comprising adjusting an amount of air that flows through the engine when regenerating the particulate filter, and further comprising reducing an amount of fuel injected to a first cylinder to receive fuel in response to the three-way catalyst being in a rich state, completing particulate filter regeneration, and an increase in engine load.

4. The engine operating method of claim 3, where the amount of air that flows through the engine is adjusted via a throttle or valve timing.

5. The engine operating method of claim 1, where combustion in the one or more cylinders ceases during regenerating the particulate filter, and where the engine was rotating via combustion in its cylinders immediately before beginning regenerating the particulate filter, and further comprising oscillating the air-fuel mixture about stoichiometry during particulate filter regeneration before maintaining an air-fuel ratio lean of stoichiometry during particulate filter regeneration.

6. The engine operating method of claim 5, where fuel injected to the one or more cylinders is combusted in the three-way catalyst positioned upstream of the particulate filter.

7. The engine operating method of claim 1, where the engine is a direct injection turbocharged engine, and where an amount of fuel supplied to the one or more cylinders is varied to provide rich and lean air-fuel mixtures to the one or more cylinders.

8. An engine operating method, comprising:
supplying a spark to combust an air-fuel mixture in an engine;
storing particulate matter produced by combusting the air-fuel mixture in a particulate filter;
heating the particulate filter to facilitate particulate filter regeneration via ceasing to deliver spark to a cylinder in response to engine load less than a threshold and while the engine is rotating via torque supplied by vehicle wheels; and
injecting fuel into the cylinder during an exhaust stroke of the cylinder, while spark delivery remains ceased in the cylinder, in response to an increase in engine load and completing particulate filter regeneration.

9. The engine operating method of claim 8, further comprising supplying fuel to the cylinder while ceasing to deliver spark to the cylinder, and adjusting a state of a three-way catalyst in response to completing particulate filter regeneration.

10. The engine operating method of claim 8, further comprising not delivering fuel to the cylinder while ceasing to deliver spark to the cylinder in response to engine load being less than the threshold and an amount of particulate matter stored in the particulate filter being less than a threshold.

11. The engine operating method of claim 10, where the engine is in a deceleration fuel cut-out mode when not delivering fuel to the cylinder.

12. The engine operating method of claim 8, where fuel is injected during the exhaust stroke of the cylinder in response to a state of a catalyst being lean, and further comprising oscillating the air-fuel mixture about stoichiometry during particulate filter regeneration before maintaining an air-fuel ratio lean of stoichiometry during particulate filter regeneration.

13. The engine operating method of claim 8, further comprising ceasing to inject fuel to the cylinder when a temperature of a three-way catalyst is less than a threshold temperature.

14. A system for controlling an engine, comprising:
an engine;
an ignition system supplying spark to the engine;
a particulate filter and a three-way catalyst in an exhaust system of the engine; and
a controller including executable instructions stored in non-transitory memory for retarding spark timing and increasing a time-varying amplitude of an air-fuel ratio to break through the three-way catalyst rich and lean and regenerate the particulate filter in a first mode, and executable instructions to cease spark delivery and inject fuel while ceasing spark delivery to regenerate the particulate filter in a second mode in response to a tip-out and engine load below a threshold.

15. The system of claim 14, further comprising additional executable instructions for additionally retarding spark proportionate to leanness of the air-fuel ratio when the air-fuel ratio is lean in the first mode.

16. The system of claim 14, further comprising additional executable instructions for adjusting oxygen stored in the three-way catalyst responsive to a regeneration state of the particulate filter, and additional executable instructions to increase engine air flow when the air-fuel ratio is lean in the first mode.

17. The system of claim 14, further comprising additional executable instructions to supply fuel to a cylinder during an exhaust stroke in response to an increase in an engine load request after particulate filter regeneration is complete from the second mode.

18. The system of claim 14, further comprising additional executable instructions to enrich an engine air-fuel ratio in response to a lean state of a catalyst during an increase in an engine load request during the second mode.

19. The system of claim 14, where the time-varying amplitude varies between rich and lean of stoichiometry.

* * * * *